United States Patent
Nikitin et al.

(10) Patent No.: US 7,472,358 B2
(45) Date of Patent: Dec. 30, 2008

(54) METHOD AND SYSTEM FOR OUTPUTTING A SEQUENCE OF COMMANDS AND DATA DESCRIBED BY A FLOWCHART

(75) Inventors: Andrey A. Nikitin, Moscow (RU); Alexander E. Andreev, San Jose, CA (US); Ranko Scepanovic, Saratoga, CA (US)

(73) Assignee: LSI Corporation, Milpitas, CA (US)

( * ) Notice: Subject to any disclaimer, the term of this patent is extended or adjusted under 35 U.S.C. 154(b) by 395 days.

(21) Appl. No.: 11/260,517

(22) Filed: Oct. 27, 2005

(65) Prior Publication Data

US 2007/0169009 A1   Jul. 19, 2007

(51) Int. Cl.
*G06F 17/50* (2006.01)
(52) U.S. Cl. .................... 716/1; 716/17; 716/18
(58) Field of Classification Search .......... 716/1, 716/17, 18
See application file for complete search history.

(56) References Cited

U.S. PATENT DOCUMENTS

| 5,784,291 | A | * | 7/1998 | Chen et al. | 716/10 |
| 6,606,588 | B1 | * | 8/2003 | Schaumont et al. | 703/15 |
| 6,981,232 | B1 | * | 12/2005 | Lien et al. | 716/3 |
| 2003/0033373 | A1 | * | 2/2003 | Horn et al. | 709/217 |

* cited by examiner

*Primary Examiner*—Vuthe Siek
*Assistant Examiner*—Brandon W Bowers
(74) *Attorney, Agent, or Firm*—Suiter Swantz PC LLO (57) ABSTRACT

The present invention is a method and system for outputting a sequence of commands and data described by a flowchart. The method includes steps as follows. A flowchart describing a sequence of commands and data is received. The flowchart includes a plurality of flowchart symbols. Each of the plurality of flowchart symbols is assigned a ROM (read only memory) record. Assigned ROM records are stored in a ROM. A processor is generated to include the ROM, wherein the processor receives as input a CLOCK signal, a RESET signal, an ENABLE signal and N binary inputs $x_1, x_2, \ldots x_N$, and outputs the sequence of commands and data.

10 Claims, 4 Drawing Sheets

METHOD AND SYSTEM FOR OUTPUTTING A SEQUENCE OF COMMANDS AND DATA DESCRIBED BY A FLOWCHART

CROSS REFERENCE TO RELATED APPLICATIONS

The present application incorporates co-pending U.S. patent application Ser. No. 10/894,781, filed Jul. 20, 2004 by reference in its entirety.

FIELD OF THE INVENTION

The present invention generally relates to the field of integrated circuits, particularly to a method and system for outputting a sequence of commands and data described by a flowchart.

BACKGROUND OF THE INVENTION

Platform-based IC (integrated circuit) design is a powerful concept for coping with the increased pressure on time-to-market, design and manufacturing costs encountered in the current IC market. A platform is a large-scale, high-complexity semiconductor device that includes one or more of the following elements: (1) memory; (2) a customizable array of transistors; (3) an IP (intellectual property) block; (4) a processor, e.g., an ESP (embedded standard product); (5) an embedded programmable logic block; and (6) interconnect. RapidChip™ developed by LSI Logic Corp. is an instance of a platform. The basic idea behind the platform-based design is to avoid designing and manufacturing a chip from scratch. Some portion of the chip's architecture is predefined for a specific type of application. Through extensive design reuse, the platform-based design may provide faster time-to-market and reduce design cost.

Under a platform approach, there are two distinct steps entailed in creating a final end-user product: a prefabrication step and a customization step. In a prefabrication step, a slice is built on a wafer. A slice is a pre-manufactured chip in which all silicon layers have been built, leaving the metal layers or top metal layers to be completed with the customer's unique IP. For example, RapidSlice™ developed by LSI Logic Corp. is an instance of a slice. One or more slices may be built on a single wafer. It is understood that a slice may include one or more bottom metal layers or may include no metal layers at all. In a preferred embodiment of the prefabrication step, portions of the metal layers are pre-specified to implement the pre-defined blocks of the platform and the diffusion processes are carried out in a wafer fab. The base characteristics, in terms of the IP, the processors, the memory, the interconnect, the programmable logic and the customizable transistor array, are all pre-placed in the design and pre-diffused in the slice. However, a slice is still fully decoupled because the customer has not yet introduced the function into the slice. In a customization step, the customer-designed function is merged with the pre-defined blocks and the metal layers (or late-metal components) are laid down, which couple the elements that make up the slice built in the wafer fab, and the customizable transistor array is configured and given its characteristic function. In other embodiments, early-metal steps may be part of the pre-fabricated slice to reduce the time and cost of the customization step, resulting in a platform which is more coupled and specific. It is understood that a prefabrication step and a customization step may be performed in different foundries. For example, a slice may be manufactured in one foundry. Later, in a customization step, the slice may be pulled from inventory and metalized, which gives the slice its final product characteristics in a different foundry.

A slice such as RapidSlice™ may contain several RRAMs (Reconfigurable RAMs, or Redundant RAMs, or Rapid-Slice™ RAMs). Each RRAM is a set of memories of the same type that are placed compactly. RRAMs include built-in testing and self-repairing components. The process of testing memories of RRAMs and self-repairing these memories is managed by a RRAM controller, which may receive a sequence of commands and data output by a kernel of this controller, or processor. The processor is a device that has N binary inputs: $x_1, x_2, \ldots x_N$, and 2 wide outputs: command and data. The processor may produce as output a specific sequence of commands and data. These commands and data are then sent to other devices of the RRAM controller for further processing.

Under a platform approach, RRAMs, the RRAM controller, and the processor are typically pre-diffused in a slice. Since different customers may use RRAMs differently, it is thus desirable to provide a processor that includes as few variable components as possible. That is, it is desirable to have a processor where the change of the sequence of commands and data to be output by the processor may not lead to the global change of the processor already diffused in the slice.

SUMMARY OF THE INVENTION

In a first exemplary aspect of the present invention, a method for outputting a sequence of commands and data described by a flowchart includes steps as follows. A flowchart describing a sequence of commands and data is received. The flowchart includes a plurality of flowchart symbols. Each of the plurality of flowchart symbols is assigned a ROM (read only memory) record. Assigned ROM records are stored in a ROM. A processor is generated to include the ROM, wherein the processor receives as input a CLOCK signal, a RESET signal, an ENABLE signal and N binary inputs $x_1, x_2, \ldots x_N$, and outputs the sequence of commands and data.

In a further exemplary aspect of the present invention, a method for constructing a processor for outputting a sequence of commands and data described by a flowchart includes steps as follows. A processor including a ROM is diffused in a slice. The processor is connected to a RRAM controller in the slice. A flowchart describing a sequence of commands and data is received. The flowchart includes a plurality of flowchart symbols. Each of the plurality of flowchart symbols is assigned a ROM record. The ROM records are stored in the ROM. The processor outputs the sequence of commands and data to the RRAM controller for managing a process of testing and self-repairing memories of RRAMs, which are communicatively coupled to the RRAM controller.

In another exemplary aspect of the present invention, a system for outputting a sequence of commands and data described by a flowchart includes a ROM for storing ROM records. The ROM records are assigned to flowchart symbols, which are used by a flowchart to describe or define a sequence of commands and data. The system further includes a logic module PROCESSOR_CONTROL for receiving the ROM records from the ROM and outputting the sequence of commands and data. The logic module PROCESSOR_CONTROL is communicatively coupled to the ROM and includes flip-flops.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
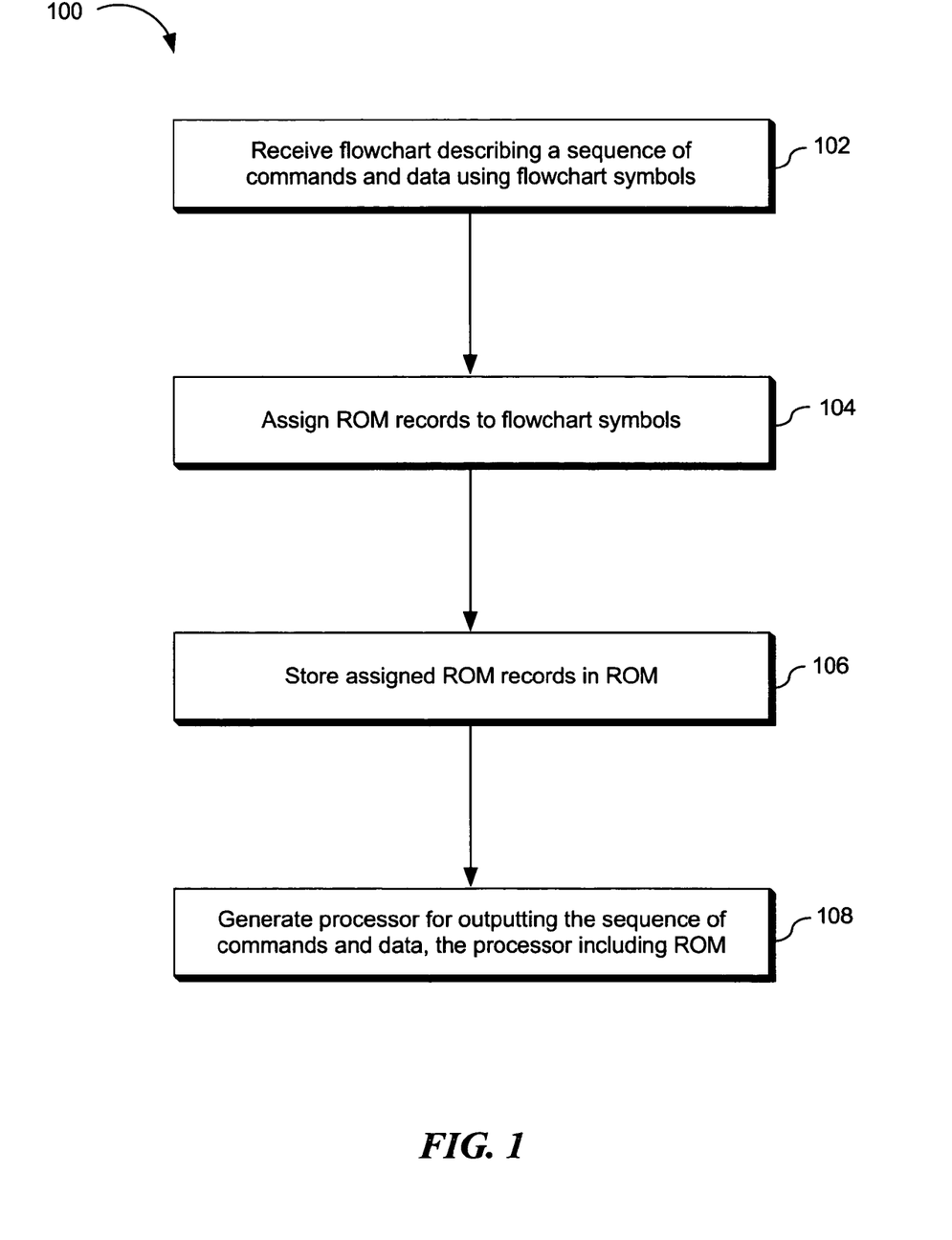
FIG. 1 is a flow diagram showing a method for outputting a sequence of commands and data described by a flowchart in accordance with an exemplary embodiment of the present invention.

FIG. 1 is a flow diagram showing a method 100 for outputting a sequence of commands and data described by a flowchart in accordance with an exemplary embodiment of the present invention. The method 100 may start with step 102 in which a flowchart describing a sequence of commands and data is received. The flowchart includes a plurality of flowchart symbols. In a preferred embodiment, the flowchart symbols includes: command and data, jump, optional jump, start, finish, start subflowchart, call subflowchart, and finish subflowchart. The command and data symbol contains 2 values: command and data desired to be output when this symbol is processed. The command and data symbol may also have a condition that can be of one of the following four types: if($x_k$) or if(!$x_k$) or while($x_k$) or while(!$x_k$). If the command and data symbol has a condition, then command and data are output if $x_k=1$ only, if $x_k=0$ only, while $x_k=1$, or while $x_k=0$. The command and data symbol with the condition "if" is called an optional command and data symbol. The command and data symbol with the condition "while" is called a continuous command and data symbol. The command and data symbol with no condition is called a simple command and data symbol.

The jump symbol contains the address of the flowchart symbol that need be processed immediately after the current symbol. The optional jump symbol has the address of the flowchart symbol that need be processed immediately after the current symbol if some condition is valid. The condition may be of one of the following two types: if ($x_k$) or if (!$x_k$). The start and finish are the symbols which mean starting and finishing the processor work, respectively. The start symbol must be the first symbol of the flowchart. All of the following symbols jump, optional jump, finish, call subflowchart and finish subflowchart may also have 2 values: command and data that need be output when the given symbol is being executed.

The flowchart may include some subflowcharts. Each subflowchart starts with the symbol start subflowchart and finishes with the symbol finish subflowchart. The subflowchart may be called from any place of the flowchart and may be called from any other subflowchart. Let M be the maximal depth of the subflowchart call stack. Below is an example of a flowchart describing a sequence of commands and data:

1. start
2. command 1, data 2 if($x_1$)
3. command 1, data 3
4. if ($x_1$) goto 8
5. if (!$x_2$) goto 8, command 6, data 5
6. call subflowchart1
7. call subflowchart1
8. command 8, data 8 while($x_2$)
9. finish
10. start subflowchart1
11. call subflowchart2
12. call subflowchart2, command 7, data 7
13. finish subflowchart1
14. start subflowchart2
15. command 2, data 3
16. command 2, data 4
17. finish subflowchart2

The foregoing-indicated exemplary flowchart has 2 inputs: $x_1$ and $x_2$. The maximal call stack depth M=3. If the values of inputs $x_1$ and $x_2$ are 0 and 1, respectfully, then the processor described by the flowchart generates the following sequence of commands and data on its outputs: (1,3), (6,5), (2,3), (2,4), (7,7), (2,3), (2,4), (2,3), (2,4), (7,7), (2,3), (2,4), (8,8), (8,8), (8,8), . . . If $x_1=0$ and $x_2=0$, then the sequence is (1,3), (6,5). If $x_1=1$ and $x_2=0$, then the sequence is (1,2), (1,3). If $x_1=1$ and $x_{2=1}$, then the sequence is (1,2), (1,3), (8,8), (8,8), (8,8), . . .

The present invention may provide a method for constructing a processor for a flowchart. The processor may be diffused on a predetermined slice such as RapidChip™, and the like. The processor insertion (placement, routing, etc.) into the slice is implemented only once. Thus, it is desirable to develop a processor with as few variable parts as possible. That is, the change of the flowchart may not lead to a global change of the processor already diffused on the slice. The present invention may fulfill this requirement. The variable part of the present processor is the data stored in the special ROM (read only memory). All other parts of the present processor are constant and may, together with ROM, be inserted in the slice and be permanently connected to RRAMs and some other slice cores.

The co-pending U.S. patent application Ser. No. 10/894,781, filed Jul. 20, 2004 disclosed a RapidChip™ RRAM control kernel device (CKD). In comparison with the CKD, the present processor may make great improvement because of the following reasons. First, the present processor supports a wider set of flowcharts than the CKD does. The CKD does not support optional and continuous command and data symbols and supports simple command and data symbols only. The CKD also does not support outputting some commands and data while processing jump, optional jump, finish, call subflowchart, finish subflowchart symbols. Moreover, the timing characteristics of the present processor are much better than the timing characteristics of the CKD built for the same flowchart because the processor and the CKD have different architecture. The CKD may have long timing paths that go through the ROM and logical cells of the module CKD_CONTROL. In contrast, the present processor has some extra flip-flops that break the long logical paths. Due to this feature the operating frequency of the present processor is up to 2 times better than the operating frequency of the CKD built for the same flowchart.

Let N be the maximal number of inputs of the flowchart, let M>=1 be the maximal depth of the subflowchart call stack, let S be the maximal number of symbols in the flowchart, let CS be the bit width of the output command, and let DS be the bit width of the output data. In one embodiment, the present processor (see FIG. 3) includes a ROM and some logical cells and flipflops. Denote RW to be a ROM width (or the bit size of words stored in this ROM). The capacity (number of stored words) of this ROM is equal to S (or the maximal number of flowchart symbols). Assign RW=3+CS+DS+log$_2$N+max(3, log$_2$S+log$_2$N). Throughout the present invention, the notation log$_2$A represents the smallest integer number that is not less than log$_2$A.

Figure 3:
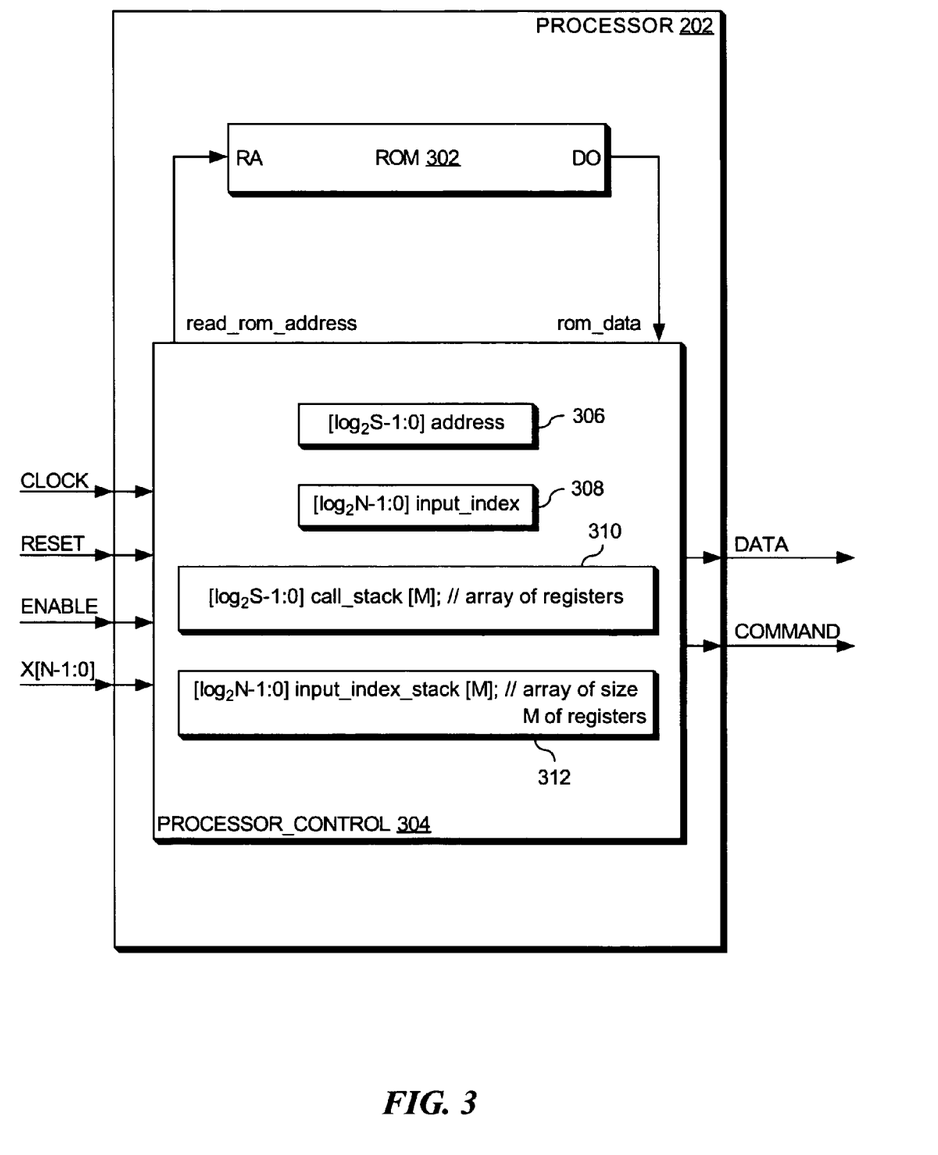
FIG. 3 shows an exemplary internal structure of the processor shown in FIG. 2 in accordance with an exemplary embodiment of the present invention.

For each symbol denote <command_value> and <data_value> to be command and data that need be output when the symbol is being processed, where <command_value> includes CS bits and <data_value> includes DS bits. For each symbol denote <input_index> as follows:

1) for symbols start, start subflowchart, simple command and data, jump, call subflowchart, finish subflowchart and finish, define <input_index>=00 . . . 0 (log$_2$N zeroes); and
2) for symbols optional command and data, continuous command and data and optional jump, define <input_index>=k$_1$k$_2$ . . . k$_{logN}$, where k$_1$k$_2$ . . . k$_{logN}$ is a binary presentation of the index "i" of the input x$_i$ involved in the condition.

For each symbol denote <next_input_index> to be the <input_index> of the symbol that follows the given symbol in the flowchart. For the last symbol of the flowchart, <next_input_index>=00 . . . 0 (log$_2$N zeroes).

Still referring to FIG. 1, each of the plurality of flowchart symbols is examined and assigned a ROM (read only memory) record 104. The ROM record may be assigned as follows:

1) for symbols start or start subflowchart:
000<command_value><data_value><next_input_index>;
2) for symbol simple command and data:
001<command_value><data_value><next_input_index>000;
3) for symbol optional command and data if(x$_i$):
001<command_value><data_value><next_input_index>001;
4) for symbol optional command and data if(!x$_i$):
001<command_value><data_value><next_input_index>002;
5) for symbol continuous command and data while(x$_i$):
001<command_value><data_value><next_input_index>003;
6) for symbol continuous command and data while(!x$_i$):
001<command_value><data_value><next_input_index>004;
7) for symbol jump:
002<command_value><data_value><next_input_index><jump_address>;
8) for symbol optional jump with condition if(x$_i$):
003<command_value><data_value><next_input_index><jump_address><jump_input_index>, where the <jump_input_index> is the <input_index> of symbol to which jump is addressed;
9) for symbol optional jump with condition if(!x$_i$):
004<command_value><data_value><next_input_index><jump_address><jump_input_index>, where the <jump_input_index> is the <input_index> of symbol to which jump is addressed;
10) for symbol call subflowchart:
005<command_value><data_value><next_input_index><address><jump_input_index>, where <address> is the address of the symbol start subflowchart of the corresponding subflowchart, and <jump_input_index> is the <input_index> of this symbol;
11) for symbol finish subflowchart:
006<command_value><data_value><next_input_index>; and
12) for symbol finish:
002<command_value><data_value><input_index><address><input_index>, where <address> is the address of the given flowchart symbol finish. It means that when one reaches the finish symbol, one stops at this symbol forever (while the signal RESET does not appear).

Assigned ROM records are stored in a ROM (e.g. ROM 302 in FIG. 3) 106. It is possible that the ROM record assigned for a flowchart symbol may have a bit size that is less than a width RW of the ROM. In this case, preferably at least one zero is appended to the end of the ROM record in order to obtain the size RW.

Figure 2:
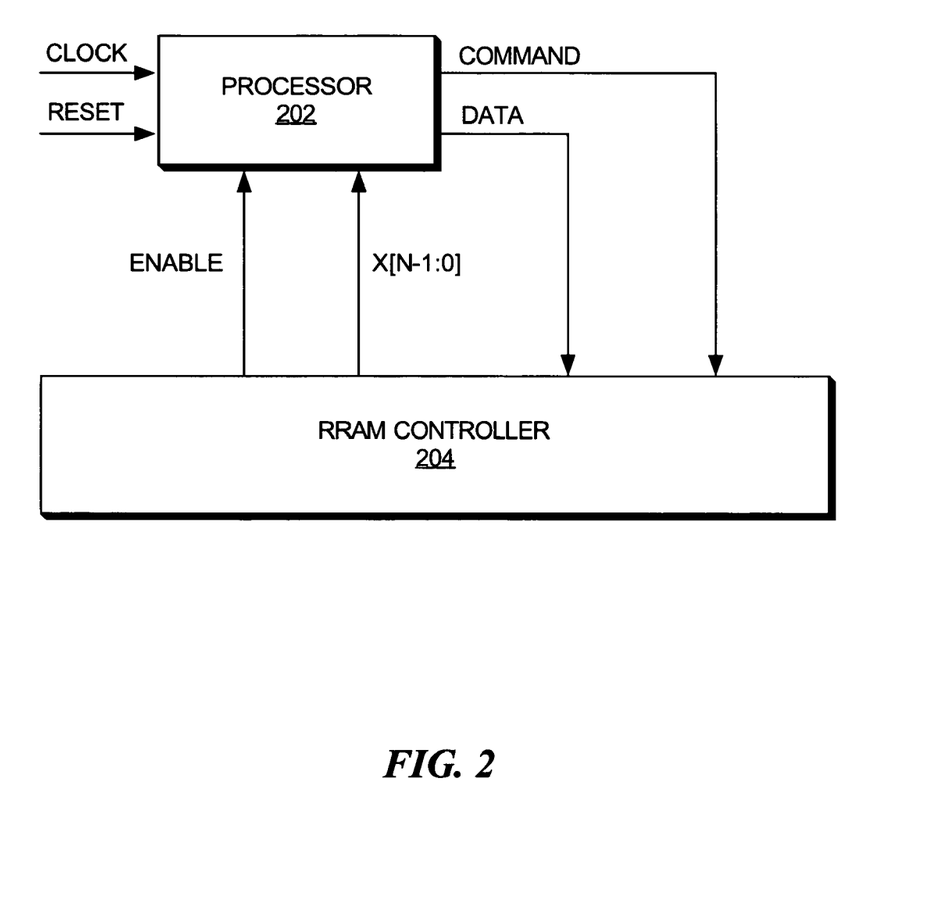
FIG. 2 is a simplified schematic diagram showing a system for outputting a sequence of commands and data described by a flowchart in accordance with an exemplary embodiment of the present invention, where the system includes a processor and a RRAM controller.

A processor is generated to include the ROM, wherein the processor receives as input a CLOCK signal, a RESET signal, an ENABLE signal and N binary inputs x$_1$, x$_2$, . . . x$_N$, and outputs the sequence of commands and data 108. The processor (see, e.g., processor 202 in FIGS. 2 and 3) generates the sequence of commands and data described by the flowchart to a RRAM controller (see, e.g., RRAM controller 204 in FIG. 2). The processor may have some additional ports: input CLOCK, input RESET, and input ENABLE. The inputs CLOCK and RESET are the clock and reset inputs that drive all flipflops and ROM of the processor, and the input ENABLE is used for temporarily halting the work of the processor. If ENABLE=0, then the work of the module is halted. The processor may be described in a hardware description language.

The following is a description of a processor architecture (see, e.g., processor 202 in FIG. 3) in a hardware description language similar to Verilog:

```
module PROCESSOR(CLOCK, RESET, ENABLE, X, COMMAND, DATA)
  input CLOCK, RESET, ENABLE;
  input [N-1:0] X;
  output [CS-1:0] COMMAND;
  output [DS-1:0] DATA;
  wire [log₂S-1:0] read_rom_address;
  wire [RW-1:0] rom_data;
  ROM rom_inst (.RA(read_rom_address), .DO(rom_data));
  PROCESSOR_CONTROL control_inst (.ENABLE (ENABLE), .X(X), .COMMAND(COMMAND), .DATA(DATA), .rom_data(rom_data), .read_address (read_rom_address));
endmodule
```

As shown, the module PROCESSOR contains 2 instances: the instance "rom_inst" of the ROM and the instance "control_inst" of a logical module PROCESSOR_CONTROL (e.g., PROCESSOR_CONTROL 304 in FIG. 3, which includes flipflops 306, 308, 310 and 312, and logics) that processes the data "rom_data" read from the ROM and generates the "read_address".

The logical module PROCESSOR_CONTROL may be described as follows:

```
module PROCESSOR_CONTROL(ENABLE, X, COMMAND, DATA,
rom_data, read_address)
    input ENABLE;
    input [N-1:0] X;
    output [CS-1:0] COMMAND;
    output [DS-1:0] DATA;
    input [RW-1:0] rom_data;
    output [log_2S-1:0] read_address;
    wire [2:0] symbol_type;
    wire [CS-1:0] tmp_command;
    wire [DS-1:0] tmp_data;
    wire [log_2S-1:0] jump_address;
    wire [2:0] command_condition_type;
    wire [log_2N-1:0] next_input_index;
    wire [log_2N-1:0] jump_input_index;
    assign symbol_type = rom_data[2:0];
    assign tmp_command = rom_data[CS+2 : 3];
    assign tmp_data = rom_Data[DS+CS+2 : CS+3];
    assign command_condition_type = rom_data[DS+CS+5 : DS+CS+3];
    assign next_input_index = rom_data[log_2N+DS+CS+2 : DS+CS+3];
    assign jump_address = rom_data_[log_2S+log_2N+DS+CS+2 :
        log_2N+DS+CS+3];
    assign jump_input_index  =  rom_data[log_2S+2log_2N+DS+
        CS+2   :   log_2S+ log_2N+DS+CS+3];
    wire valid_output;
    reg [log_2S-1:0] address;
    reg [log_2N-1:0] input_index;
    reg [log_2S-1:0] call_stack[M]; // array of registers of the length M
    reg [log_2N-1:0] input_index_stack[M];    // array of the registers
    of the length M
    wire [log_2N-1:0] current_input_index;
    if (ENABLE==0) {
        valid_output = 0;
    }
    else {
        current_input_index = input_index;
        read_address = address+1;
        valid_output = 1;
        input_index = next_input_index;
        switch (symbol_type) {
            case 3b'000: // start or start subflowchart
                break;
            case 3b'001: // command and data
                switch (command_condition_type) {
                    case 3b'001: // optional command and data if(x_i)
                        if (X[input_index]==0) {
                            valid_output = 0;
                        }
                    case 3b'002: // optional command and data if(!x_i)
                        if (X[input_index]==1) {
                            valid_output = 0;
                        }
                    case 3b'003: // continuous command and data while(x_i)
                        if (X[input_index]==1) {
                            read_address = address;
                            input_index = current_input_index;
                        }
                        else {
                            valid_output = 0;
                        }
                    case 3b'004: // continuous command and data while(!x_i)
                        if (X[input_index]==0) {
                            read_address = address;
                            input_index = current_input_index;
                        }
                        else {
                            valid_output = 0;
                        }
                    break;
                }
                break;
            case 3b'002: // jump or finish
                read_address = jump_address;
                input_index = jump_input_index;
                break;
            case 3b'003: // optional jump with condition if(x_i)
                if (X[input_index]==1) {
                    read_address = jump_address;
                    input_index = jump_input_index;
                }
                break;
            case 3b'004: // optional jump with condition if(!x_i)
                if (X[input_index]==0) {
                    read_address = jump_address;
                    input_index = jump_input_index;
                }
                break;
            case 3b'005: // call subflowchart
                read_address = jump_address;
                input_index = jump_input_index;
                for (int i=M-1;i>=1;i--) {
                    call_stack[i] = call_stack[i-1];
                    input_index_stack[i] = input_index_stack[i-1];
                }
                call_stack[0] = address+1;
                input_index_stack[0] = next_input_index;
                break;
            case 3b'006: // finish subflowchart
                read_address = call_stack[0];
                input_index = input_index_stack[0];
                for (int i=1;i<M;i++) {
                    call_stack[i-1] = call_stack[i];
                    input_index_stack[i-1] = input_index_stack[i];
                }
                break;
        }
        address = read_address;
    }
    assign COMMAND = valid_output & tmp_command;
    assign DATA valid_output & tmp_data;
endmodule
```

The registers "call_stack[i]", i=0, 1, ..., M−1, store the subflowchart call stack addresses. The registers "input_index_stack[i]", i=0, 1, ..., M−1, store the <input_indexes> of symbols with addresses "call_stack[i]". Due to storing "input_indexes" of executed symbols in registers (flipflops), one may achieve a significant reduction of the length of the logical paths through ROM and PROCESSOR_CONTROL in comparison with the analogue paths of the CKD described in the co-pending U.S. patent application Ser. No. 10/894, 781, filed Jul. 20, 2004.

It is understood that the foregoing-indicated descriptions in the hardware description language not only describes a processor architecture used for a RRAM controller, but can also be used to define an architecture for a device that sends control commands and data to other devices without departing from the scope and spirit of the present invention.

Thus, the present invention provides a method and system for creating a processor based on a given flowchart defining a sequence of commands and data. The variable part of the created processor is the data (ROM records) stored in the ROM, while all other parts of the processor remain constant. As a result, when the flowchart changes, only the data stored in the ROM needs to be changed. The present processor can thus be pre-diffused in a slice to provide a sequence of commands and data to a RRAM controller also pre-diffused in the same slice. When a customer wishes to change the sequence of commands and data to be output by the processor, the customer only needs to change the data stored in the ROM of the processor, which does not require a global change to the processor.

Figure 4:
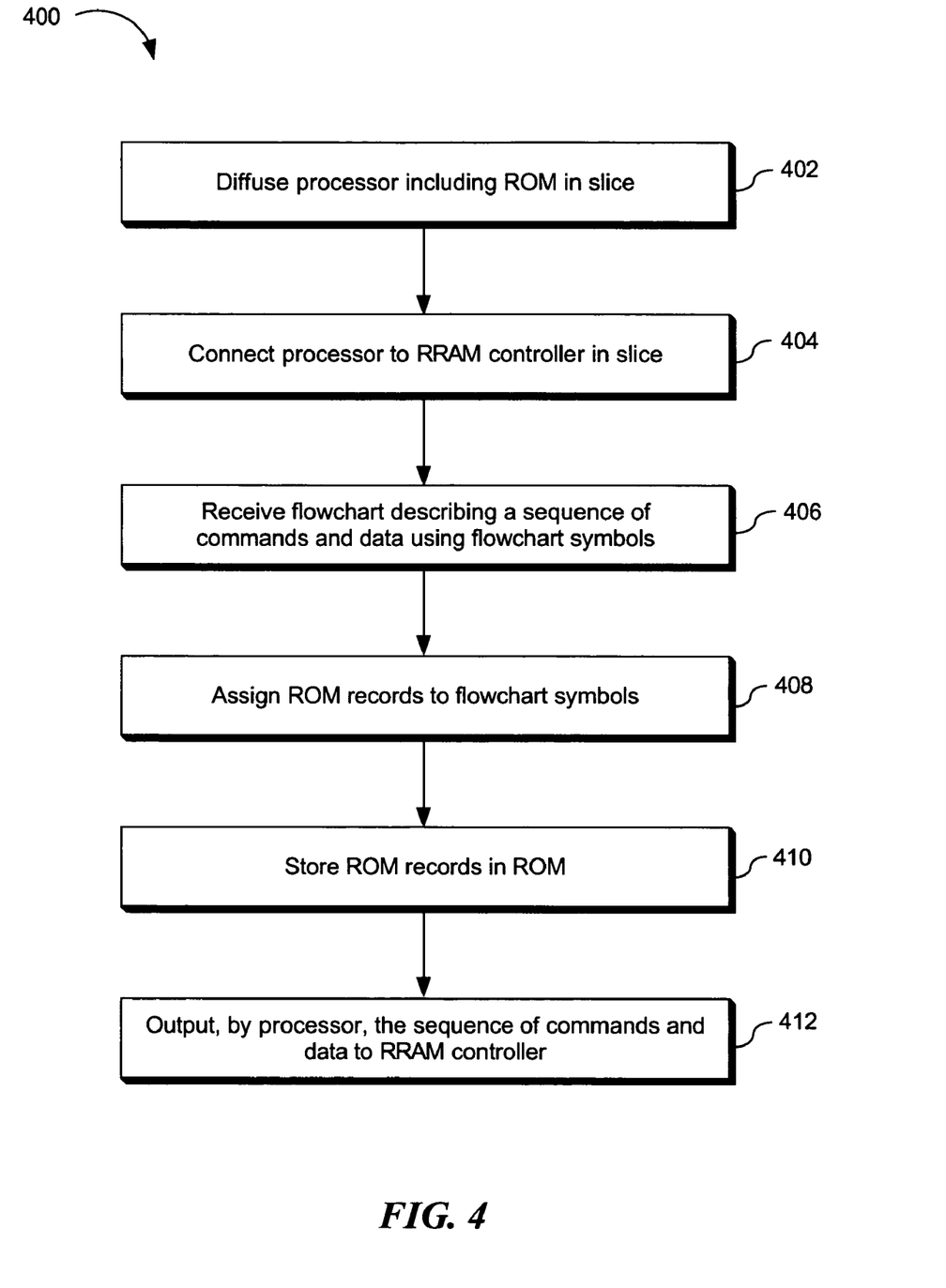
FIG. 4 is a flow diagram showing a method for constructing a processor for outputting a sequence of commands and data described by a flowchart in accordance with an exemplary embodiment of the present invention.

FIG. 4 is a flow diagram showing a method 400 for constructing a processor for outputting a sequence of commands and data described by a flowchart in accordance with an exemplary embodiment of the present invention. The method 400 may start with step 402 in which a processor including a ROM is diffused in a slice 402. The processor may have an internal architecture shown in FIG. 3 and may be described by the foregoing hardware description language. The slice is a pre-manufactured chip in which all silicon layers have been built, leaving the metal layers or top metal layers to be completed with the customer's unique IP. For example, Rapid-Slice™ developed by LSI Logic Corp. is an instance of a slice. The processor is connected to a RRAM controller also diffused in the slice 404. A flowchart describing a sequence of commands and data is received 406. The flowchart may be provided by a customer. The flowchart includes a plurality of flowchart symbols. Each of the plurality of flowchart symbols is assigned a ROM record 408. The ROM records are stored in the ROM 410. The processor outputs the sequence of commands and data to the RRAM controller for managing a process of testing and self-repairing memories of RRAMs, which are communicatively coupled to the RRAM controller 412.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magneto-optical disk, ROM, RAM, EPROM, EEPROM, magnetic or optical card, or any other suitable media for storing electronic instructions.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for outputting a sequence of commands and data described by a flowchart, comprising:
    receiving a flowchart describing a sequence of commands and data, said flowchart including a plurality of flowchart symbols;
    assigning a ROM record for each of said plurality of flowchart symbols;
    storing assigned ROM records in a ROM; and
    generating a processor including said ROM,
    wherein said processor receives as input a CLOCK signal, a RESET signal, an ENABLE signal and N binary inputs $X_1, X_2, \ldots X_N$, and outputs said sequence of commands and data, said plurality of flowchart symbols include command and data, jump, optional jump, start, finish, start subflowchart, call subflowchart, and finish subflowchart, said ROM records are assigned as follows:

1) for symbols start or start subflowchart: 000<command value><data_value><next_input_index>;
    2) for symbol simple command and data: 001<command value><data_value><next_input_index>000;
    3) for symbol optional command and data if($x_i$): 001<command value><data_value><next_input_index>001;
    4) for symbol optional command and data if(!$x_i$): 001<command value><data_value><next_input_index>002;
    5) for symbol continuous command and data while($x_i$): 001<command value><data_value><next_input_index>003;
    6) for symbol continuous command and data while(!$x_i$): 001<command value><data_value><next_input_index>004;
    7) for symbol jump: 002<command value><data_value><next_input_index><jump address>;
    8) for symbol optional jump with condition if($x_i$): 003<command value><data_value><next_input_index><jump address><jump input index>, where said <jump input index> is an <input index> of a symbol to which jump is addressed;
    9) for symbol optional jump with condition if(!$x_i$): 004<command value><data_value><next_input_index><jump address><jump input index>, where said <jump input index> is an <input index> of a symbol to which jump is addressed;
    10) for symbol call subflowchart: 005<command value><data_value><next_input_index><address><jump input index>, where said <address> is an address of a symbol start subflowchart of a corresponding subflowchart, and said <jump input index> is an <input index> of said symbol;
    11) for symbol finish subflowchart: 006<command value><data_value><next_input_index>; and
    12) for symbol finish: 002<command value><data_value><input index><address><input index>, where <address> is an address of said flowchart symbol finish.

2. The method of claim 1, wherein said processor receives as input said ENABLE signal and said N binary inputs $x_1, x_2, \ldots x_N$ from a RRAM controller and outputs said sequence of commands and data to said RRAM controller.

3. The method of claim 2, wherein said RRAM controller manages a process of testing and self-repairing memories of RRAMs, said RRAMs being communicatively coupled to said RRAM controller.

4. The method of claim 1, wherein when one of said ROM records has a bit size less than a width of said ROM, at least one zero is appended to an end of said one of said ROM records to obtain said width of said ROM.

5. The method of claim 1, wherein said generating comprises defining an architecture of said processor in a hardware description language as follows:

```
module PROCESSOR(CLOCK, RESET, ENABLE, X,
COMMAND, DATA)
    input CLOCK, RESET, ENABLE;
    input [N-1:0] X;
    output [CS-1:0] COMMAND;
    output [DS-1:0] DATA;
    wire [log2S-1:0] read_rom_address;
    wire [RW-1:0] rom_data;
    ROM rom_inst (.RA(read_rom_address), .DO(rom_data));
    PROCESSOR_CONTROL control_inst (.ENABLE(ENABLE), .X(X),
        .COMMAND(COMMAND), .DATA(DATA),
        .rom_data(rom_data), .read_address(read_rom_address));
endmodule
module PROCESSOR_CONTROL(ENABLE, X, COMMAND, DATA,
rom_data, read_address)
    input ENABLE;
    input [N-1:0] X;
    output [CS-1:0] COMMAND;
    output [DS-1:0] DATA;
    input [RW-1:0] rom_data;
    output [log2S-1:0] read_address;
    wire [2:0] symbol_type;
    wire [CS-1:0] tmp_command;
    wire [DS-1:0] tmp_data;
    wire [log2S-1:0] jump_address;
    wire [2:0] command_condition_type;
    wire [log2N-1:0] next_input_index;
    wire [log2N-1:0] jump_input_index;
    assign symbol_type = rom_data[2:0];
    assign tmp_command = rom_data[CS+2 : 3];
    assign tmp_data = rom_data[DS+CS+2 : CS+3];
    assign command_condition_type = rom_data[DS+CS+5 : DS+CS+3];
    assign next_input_index = rom_data[log2N+DS+CS+2 : DS+CS+3];
    assign jump_address = rom_data[log2S+log2N+DS+CS+2 :
    log2N+DS+CS+3];
    assign jump_input_index  =  rom_data[log2S+
    2log2N+DS+CS+2  :  log2S+ log2N+DS+CS+3];
    wire valid_output;
    reg [log2S-1:0] address;
    reg [log2N-1:0] input_index;
    reg [log2S-1:0] call_stack[M]; // array of registers of the length M
    reg [log2N-1:0] input_index_stack[M];   // array of the registers
    of the length M
    wire [log2N-1:0] current_input_index;
    if (ENABLE==0) {
        valid_output = 0;
    }
    else {
        current_input_index = input_index;
        read_address = address+1;
        valid_output = 1;
        input_index = next_input_index;
        switch (symbol_type) {
            case 3b'000: // start or start subflowchart
                break;
            case 3b'001: // command and data
                switch (command_condition_type) {
                    case 3b'001: // optional command and data if(x_i)
                        if (X[input_index]==0) {
                            valid_output = 0;
                        }
                    case 3b'002: // optional command and data if(!x_i)
                        if (X[input_index]==1) {
                            valid_output = 0;
                        }
                    case 3b'003: // continuous command and data while(x_i)
                        if (X[input_index]==1) {
                            read_address = address;
                            input_index = current_input_index;
                        }
                        else {
                            valid_output = 0;
                        }
                    case 3b'004: // continuous command and data while(!x_i)
                        if (X[input_index]==0) {
                            read_address = address;
                            input_index = current_input_index;
                        }
                        else {
                            valid_output = 0;
                        }
                        break;
                    }
                    break;
                case 3b'002: // jump or finish
                    read_address = jump_address;
                    input_index = jump_input_index;
                    break;
                case 3b'003: // optional jump with condition if(x_i)
                    if (X[input_index]==1) {
                        read_address = jump_address;
                        input_index = jump_input_index;
                    }
                    break;
                case 3b'004: // optional jump with condition if(!x_i)
                    if (X[input_index]==0) {
                        read_address = jump_address;
                        input_index = jump_input_index;
                    }
                    break;
                case 3b'005: // call subflowchart
                    read_address = jump_address;
                    input_index = jump_input_index;
                    for (int i=M-1;i>=1;i--) {
                        call_stack[i] = call_stack[i-1];
                        input_index_stack[i] = input_index_stack[i-1];
                    }
                    call_stack[0] = address+1;
                    input_index_stack[0] = next_input_index;
                    break;
                case 3b'006: // finish subflowchart
                    read_address = call_stack[0];
                    input_index = input_index_stack[0];
                    for (int i=1;i<M;i++) {
                        call_stack[i-1] = call_stack[i];
                        input_index_stack[i-1] = input_index_stack[i];
                    }
                    break;
            }
            address = read_address;
        }
    assign COMMAND = valid_output & tmp_command;
    assign DATA valid_output & tmp_data;
endmodule.
```

6. A computer-readable medium having computer-executable instructions for performing a method for outputting a sequence of commands and data described by a flowchart, said method comprising:

receiving a flowchart describing a sequence of commands and data, said flowchart including a plurality of flowchart symbols;

assigning a ROM record for each of said plurality of flowchart symbols;

storing assigned ROM records in a ROM; and generating a processor including said ROM, wherein said processor receives as input a CLOCK signal, a RESET signal, an ENABLE signal and N binary inputs $x_1, X_2, \ldots X_N$, and outputs said sequence of commands and data, said plurality of flowchart symbols include command and data, jump, optional jump, start, finish, start subflowchart, call subflowchart, and finish subflowchart, said ROM records are assigned as follows:

1) for symbols start or start subflowchart: 000<command value><data_value><next_input_index>;

2) for symbol simple command and data: 001<command value><data_value><next_input_index>000;

3) for symbol optional command and data if($x_i$): 001<command value><data_value><next_input_index>001;

4) for symbol optional command and data if(!x$_i$):
001<command value><data_value><next_input_index>002;
5) for symbol continuous command and data while(x$_i$):
001<command value><data_value><next_input_index>003;
6) for symbol continuous command and data while(!x$_i$):
001<command value><data_value><next_input_index>004;
7) for symbol jump: 002<command value><data_value><next_input_index><jump address>;
8) for symbol optional jump with condition if(x$_i$):
003<command value><data_value><next_input_index><jump address><jump input index>, where said <jump input index> is an <input index> of a symbol to which jump is addressed;
9) for symbol optional jump with condition if(!x$_i$):
004<command value><data_value><next_input_index><jump address><jump input index>, where said <jump input index> is an <input index> of a symbol to which jump is addressed;
10) for symbol call subflowchart: 005<command value><data_value><next_input_index><address><jump input index>, where said <address> is an address of a symbol start subflowchart of a corresponding subflowchart, and said <jump input index> is an <input index> of said symbol;
11) for symbol finish subflowchart: 006<command value><data_value><next_input_index>; and
12) for symbol finish: 002<command value><data_value><input index><address><input index>, where <address> is an address of said flowchart symbol finish.

7. The computer-readable medium of claim 6, wherein said processor receives as input said ENABLE signal and said N binary inputs x$_1$, x$_2$, ... x$_N$ from a RRAM controller and outputs said sequence of commands and data to said RRAM controller.

8. The computer-readable medium of claim 7, wherein said RRAM controller manages a process of testing and self-repairing memories of RRAMs, said RRAMs being communicatively coupled to said RRAM controller.

9. The computer-readable medium of claim 6, wherein when one of said ROM records has a bit size less than a width of said ROM, at least one zero is appended to an end of said one of said ROM records to obtain said width of said ROM.

10. The computer-readable medium of claim 6, wherein said generating comprises defining an architecture of said processor in a hardware description language as follows:

```
module PROCESSOR(CLOCK, RESET, ENABLE, X,
COMMAND, DATA)
  input CLOCK, RESET, ENABLE;
  input [N-1:0] X;
  output [CS-1:0] COMMAND;
  output [DS-1:0] DATA;
  wire [log2S-1:0] read_rom_address;
  wire [RW-1:0] rom_data;
  ROM rom_inst (.RA(read_rom_address), .DO(rom_data));
  PROCESSOR_CONTROL control_inst (.ENABLE(ENABLE), .X(X),
    .COMMAND(COMMAND), .DATA(DATA),
    .rom_data(rom_data), .read_address(read_rom_address));
endmodule
module PROCESSOR_CONTROL(ENABLE, X, COMMAND, DATA,
```

-continued

```
rom_data, read_address)
  input ENABLE;
  input [N-1:0] X;
  output [CS-1:0] COMMAND;
  output [DS-1:0] DATA;
  input [RW-1:0] rom_data;
  output [log2S-1:0] read_address;
  wire [2:0] symbol_type;
  wire [CS-1:0] tmp_command;
  wire [DS-1:0] tmp_data;
  wire [log2S-1:0] jump_address;
  wire [2:0] command_condition_type;
  wire [log2N-1:0] next_input_index;
  wire [log2N-1:0] jump_input_index;
  assign symbol_type = rom_data[2:0];
  assign tmp_command = rom_data[CS+2 : 3];
  assign tmp_data = rom_data[DS+CS+2 : CS+3];
  assign command_condition_type = rom_data[DS+CS+5 : DS+CS+3];
  assign next_input_index = rom_data[log2N+DS+CS+2 : DS+CS+3];
  assign jump_address = rom_data[log2S+log2N+
    DS+CS+2 : log2N+DS+CS+3];
  assign jump_input_index  =  rom_data[log2S+2log2N+
    DS+CS+2  :  log2S+ log2N+DS+CS+3];
  wire valid_output;
  reg [log2S-1:0] address;
  reg [log2N-1:0] input_index;
  reg [log2S-1:0] call_stack[M]; // array of registers of the length M
  reg [log2N-1:0] input_index_stack[M];   // array of the registers
    of the length M
  wire [log2N-1:0] current_input_index;
  if (ENABLE==0) {
    valid_output = 0;
  }
  else {
    current_input_index = input_index;
    read_address = address+1;
    valid_output = 1;
    input_index = next_input_index;
    switch (symbol_type) {
      case 3b'000: // start or start subflowchart
        break;
      case 3b'001: // command and data
        switch (command_condition_type) {
          case 3b'001: // optional command and data if(x$_i$)
            if (X[input_index]==0) {
              valid_output = 0;
            }
          case 3b'002: // optional command and data if(!x$_i$)
            if (X[input_index]==1) {
              valid_output = 0;
            }
          case 3b'003: // continuous command and data while(x$_i$)
            if (X[input_index]==1) {
              read_address = address;
              input_index = current_input_index;
            }
            else {
              valid_output = 0;
            }
          case 3b'004: // continuous command and data while(!x$_i$)
            if (X[input_index]==0) {
              read_address = address;
              input_index = current_input_index;
            }
            else {
              valid_output = 0;
            }
          break;
        }
        break;
      case 3b'002: // jump or finish
        read_address = jump_address;
        input_index = jump_input_index;
        break;
      case 3b'003: // optional jump with condition if(x$_i$)
        if (X[input_index]==1) {
          read_address = jump_address;
          input_index = jump_Input_index;
        }
```

```
        break;
case 3b'004: // optional jump with condition if(!x_i)
    if (X[input_indexl]==0) {
        read_address = jump_address;
        input_index = jump_input_index;
    }
    break;
case 3b'005: // call subflowchart
    read_address = jump_address;
    input_index = jump_input_index;
    for (int i=M-1;i>=1;i--) {
        call_stack[i] = call_stack[i-1];
        input_index_stack[i] = input_index_stack[i-1];
    }
    call_stack[0] = address+1;
    input_index_stack[0] = next_input_index;
    break;
case 3b'006: //finish subflowchart
    read_address = call_stack[0];
    input_index = input_index_stack[0];
    for (int i=1;i<M;i++) {
        call_stack[i-1] = call_stack[i];
        input_index_stack[i-1] = input_index_stack[i];
    }
    break;
  }
  address = read_address;
}
assign COMMAND = valid_output & tmp_command;
assign DATA valid_output & tmp_data;
endmodule.
```

\* \* \* \* \*